United States Patent [19]

Williams

[11] Patent Number: 5,115,908

[45] Date of Patent: May 26, 1992

[54] PACKAGE HANDLING CONVEYOR SYSTEM

[76] Inventor: John C. Williams, 770 Sweetbrier Dr., Memphis, Tenn. 38119

[21] Appl. No.: 515,219

[22] Filed: Apr. 27, 1990

[51] Int. Cl.⁵ ............................................. B65G 23/00
[52] U.S. Cl. .................. 198/832; 198/835; 198/841
[58] Field of Search ............... 198/804, 832, 835, 841, 198/842, 810, 572

[56] References Cited

U.S. PATENT DOCUMENTS

| | | | |
|---|---|---|---|
| 1,785,141 | 12/1930 | Morton | 198/835 X |
| 2,529,684 | 11/1950 | Gass | 198/842 |
| 3,082,858 | 3/1963 | King | 198/842 X |
| 3,621,986 | 11/1971 | Webb et al. | 198/841 X |
| 3,878,937 | 4/1975 | Glaser et al. | 198/835 X |
| 3,946,859 | 3/1976 | Jeffrey et al. | 198/832 X |
| 4,013,167 | 3/1977 | Bourgeois | 198/835 X |

FOREIGN PATENT DOCUMENTS

| | | | |
|---|---|---|---|
| 1072921 | 1/1960 | Fed. Rep. of Germany | 198/832 |
| 1177547 | 9/1964 | Fed. Rep. of Germany | 198/835 |
| 2254972 | 5/1974 | Fed. Rep. of Germany | 198/832 |
| 0449859 | 6/1975 | U.S.S.R. | 198/835 |
| 0848432 | 7/1981 | U.S.S.R. | 198/832 |
| 0874518 | 10/1981 | U.S.S.R. | 198/835 |
| 0762500 | 11/1956 | United Kingdom | 198/832 |
| 0766130 | 1/1957 | United Kingdom | 198/832 |
| 0772603 | 4/1957 | United Kingdom | 198/832 |
| 0777585 | 6/1957 | United Kingdom | 198/832 |

Primary Examiner—Robert P. Olszewski
Assistant Examiner—James R. Bidwell
Attorney, Agent, or Firm—John J. Mulrooney

[57] ABSTRACT

An apparatus for handling and conveying packages includes a conveyor frame for housing a combination roller-slider bed and a belt mounted on the combination roller-slider bed to define a package-supporting conveyor surface. The conveyor drive includes a drive pulley in contact with the belt, a gearbox coupled directly to the drive pulley and an electric motor coupled directly to the gearbox. The shaft of the drive pulley is designed to fit within the output shaft of the gearbox. The motor and gearbox are mounted adjacent to but outside of the conveyor frame. Electrical or mechanical system associated with the apparatus controls the speed and acceleration of the belt.

1 Claim, 4 Drawing Sheets

PACKAGE HANDLING CONVEYOR SYSTEM

BACKGROUND OF THE INVENTION

This invention relates to improvements in systems for handling and conveying packages, and, more particularly, to a conveyor system having a belt which moves along a combination roller-slider bed surface and which is powered through a shaft-mounted gear drive positioned outside of the conveyor system frame, with means for controlling acceleration and deceleration of the belt.

Systems for handling and conveying packages are known and generally have comprised a slider bed conveyor having a wide endless belt which slides over a solid smooth surface usually made of steel. Such systems are usually powered by an assembly of drive pulleys on which the belt is mounted which in turn are driven by a motor, gearbox and chains or other power transmission components which are mounted below the conveyor belt and within the frame of the conveyor, all of which caused the prior art design to be higher, wider, longer and more difficult to work on. Such prior package handling and conveying systems have performed satisfactorily in situations involving relatively light loads and work cycles not involving frequent starting and stopping. However, recent attempts to adapt such slider bed conveyor systems to new industries has exposed inherent weaknesses and inefficiencies in such systems and has not been entirely successful.

In recent years, the overnight package delivery industry has grown to the point where there is a relatively short period of time to collect, sort and deliver hundreds of thousands of packages in order to meet the promised delivery deadlines. The main requirements of conveyor systems used in the package delivery industry are the ability to run reliably with minimal preventive maintenance and the capacity to handle heavy loads with frequent starting and stopping, all in a system located within a minimum of space. Attempts to adapt the prior art slider bed conveyor systems to the overnight package delivery industry have not been entirely satisfactory. The placing of numerous packages on the conveyor belt creates a heavy load which causes high friction forces between the belt and the slider bed, thereby causing excessive heat build-up which has no method of escaping. This excessive friction heat build-up causes several mechanical and operating problems such as causing the conveyor belt backing material to disintegrate and become gummy whereby it adheres to the slider bed surface and the belt drive pulleys, further increasing friction in the system and causing even faster deterioration of the belt, and wear on the other components. The heat build-up also causes lagging on the belt drive pulleys to delaminate causing premature failure and downtime of the system for repair. The above conditions lead to belt slippage, thus accelerating the heat build-up and the other described problems. Finally, the excessive heat build-up can cause damage to heat sensitive products handled by the system. The excessive friction of the belt causes increased belt tension which in turn causes additional mechanical and operating problems in the form of reduced belt life and reliability; reduced life of the belt lacing; less efficient operation resulting in higher operating costs for energy and replacement of failed components (e.g. chains, sprockets, bearings, motors or gear reducers.)

Prior to this invention, the solution to the problems mentioned above has been to use larger components having more capacity and horsepower to overcome the increasing loads, forces and inefficiencies of the system. The larger components and structures necessitated larger motors, gearboxes and chains, or other transmission components, to accommodate the forces and energy requirements involved. Even with the increased size and power of the modified systems, the increasing loads placed on the conveyor belt caused the friction problem to remain and caused an additional problem to be placed on the belt during starting and stopping of the system. The prior art systems had no means for regulating the acceleration of the drive system to lessen the jerking of the load during start up, causing premature failure of the belt and belt lacing means. As drive sizes were increased to overcome problems caused by friction, the forces caused during acceleration exacerbated all the previously described component wear and failure. All of these factors combined to cause high maintenance costs, high energy usage because of the system inefficiencies, and generally an unreliable conveying system in an industry requiring high reliability.

SUMMARY OF THE INVENTION

Accordingly, it is a general object of this invention to provide a novel and improved apparatus for handling and conveying packages.

Another object of this invention is to provide such package handling and conveying apparatus adapted to more reliably fulfill the load and work requirements of the package delivery industry.

Another object of this invention is to provide such a package handling and conveying apparatus having a combination roller bed surface and slider bed surface.

Another object of this invention is to provide such package handling and conveying apparatus having a drive system consisting of a drive pulley attached directly to a shaft-mounted gearbox which is coupled directly to an electric motor.

Another object of this invention is to provide such package handling and conveying apparatus which has a drive system mounted entirely outside of the conveyor frame for ease of access and maintenance with a lower overall height requirement.

Another object of this invention is to provide such package handling and conveying apparatus which reduces system friction by approximately 75%, thereby enabling use of smaller, lighter components having less energy requirements.

Another object of this invention is to provide such package handling and conveying apparatus having means for controlling the acceleration of the motor and/or belt.

These and other objects of the present invention are provided by an apparatus for handling and conveying packages including a conveyor frame for housing a combination roller-slider bed and a belt mounted on said combination roller-slider bed to define a package-supporting conveyor surface. The conveyor drive means includes a drive pulley in contact with the belt, a gearbox coupled directly to said drive pulley and an electric motor coupled directly to the gearbox. The shaft of the drive pulley is designed to fit within the output shaft of the gearbox. The motor and gearbox are mounted adjacent to but outside of the conveyor frame. Electrical or mechanical means associated with the motor control the motor speed and acceleration.

The objects are accomplished by the configuration of the components, the design of the components, and the method of construction which substantially decreases and avoids the main problem of friction between the conveyor belt and the surface on which it moves, thereby avoiding the problems caused by the friction, including excessive heat build-up, delamination and deterioration of the belt, and increased loads on the remaining parts of the system. This invention has eliminated the problems involved in the prior art systems by a novel of improved design and combination which eliminates the problems rather than attempting to overcome the problems by larger components and more power.

BRIEF DESCRIPTION OF THE DRAWINGS

These and other novel features of the invention will be readily understood from the following description taken in conjunction with the accompanying drawings in which

FIG. 5 is a partial detail view of the roller-slider bed junction.

DESCRIPTION OF THE PREFERRED EMBODIMENT

Figure 1:
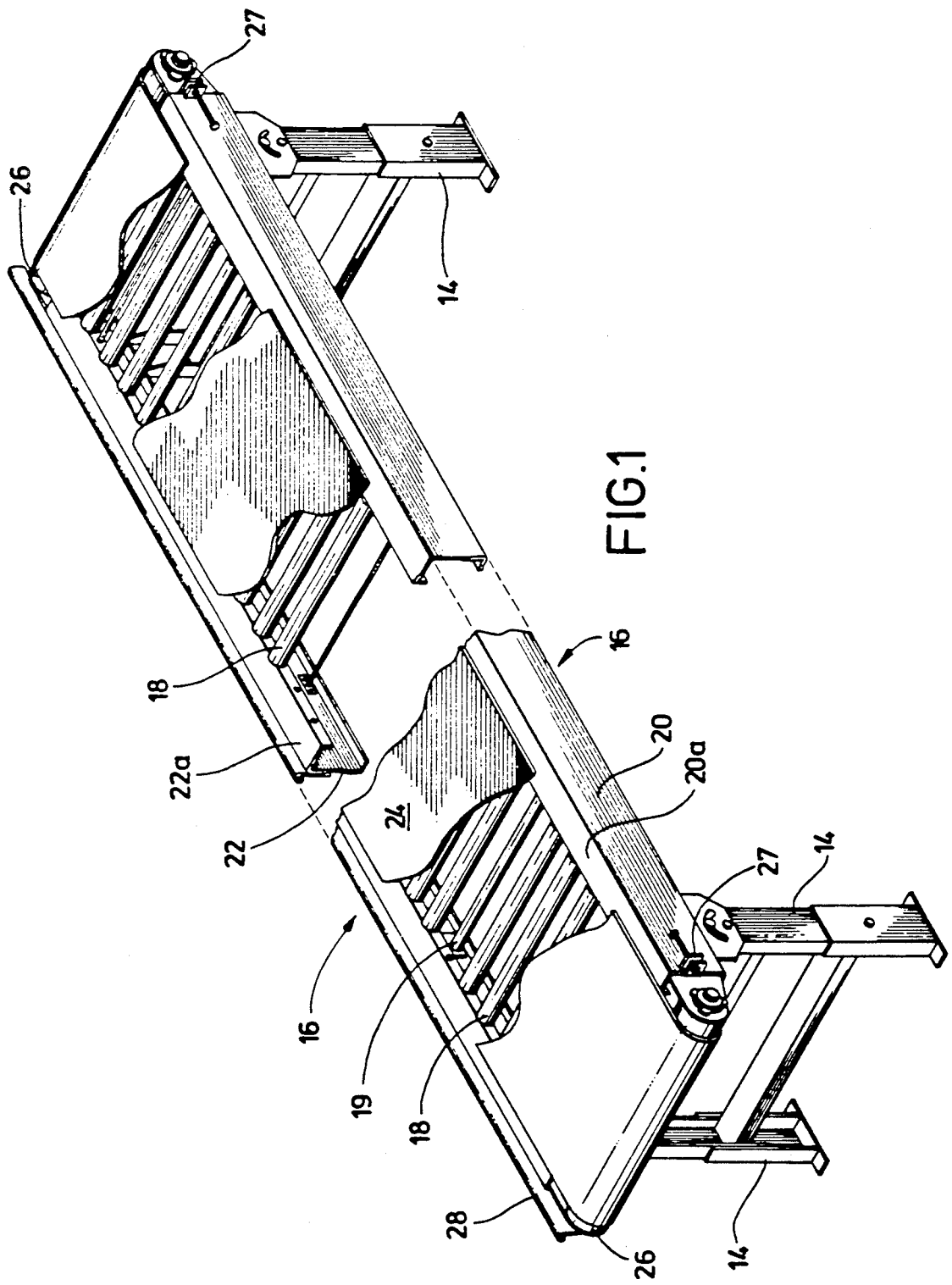
FIG. 1 is an isometric view partially broken away showing the overall conveyor system without the motor drive.

Referring now to the drawings, the apparatus of the present invention comprises a package handling and conveying system having a plurality of adjustable floor supports 14, which support a conveyor frame generally indicated by the referenced 16. The frame 16 houses a plurality of primary or conveying rollers 18 and a plurality of return rollers 19 between side frame members 20 and 22. The side frame members 20 and 22 have upwardly facing slide surfaces 20a and 22a respectively. The floor supports 14 are adjustable whereby the frame 16 may be positioned in elevation and/or inclination as is well-known in the conveyor art.

The rollers 18 and the adjacent parts of the slider surfaces 20a and 22a define a combination roller-slider bed which supports a conveyor belt 24. The belt 24 is joined at its ends by means of lacing or other known means of joining conveyor belt ends whereby the belt is continuous or endless.

A pair of end pulleys 26 located at the ends of frame 16 help support the belt 24. The tension in the belt 24 is adjustable through adjustment means 27 or other means as is well-known in the art.

Figure 3:
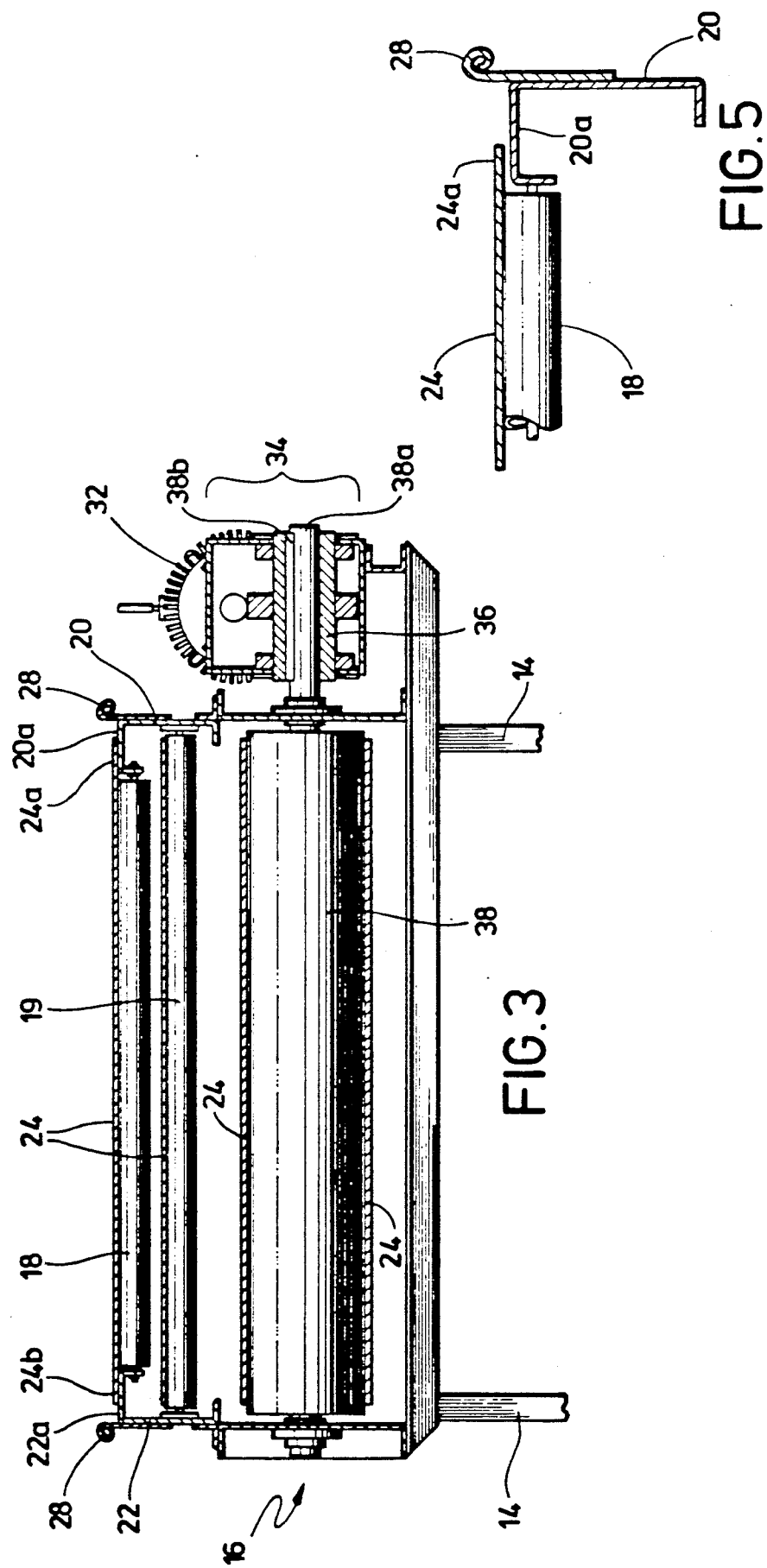
FIG. 3 is a sectional view along lines 3—3 of FIG. 2.

Referring to FIG. 3, it is seen that the belt 24 is wider than the rollers 18 but not as wide as the total width of the rollers and frame members 20 and 22. The larger portion of the belt 24 is supported by the rollers 18, and the surface of the rollers 18 that contact the belt 24 are slightly above the slider surfaces 20a and 22a of the side frame members 20 and 22 see FIG. 5. This design prevents any significant friction contact between the belt 24 and the slider bed surfaces 20a and 22a unless a package is resting on that portion of the belt 24 which is above the slider bed surfaces 20a or 22a.

As an optional feature, side guides 28 (FIG. 3) may be attached to the side frame members 20 and 22 to facilitate heavy package handling and package containment on the belt 24.

Figure 4:
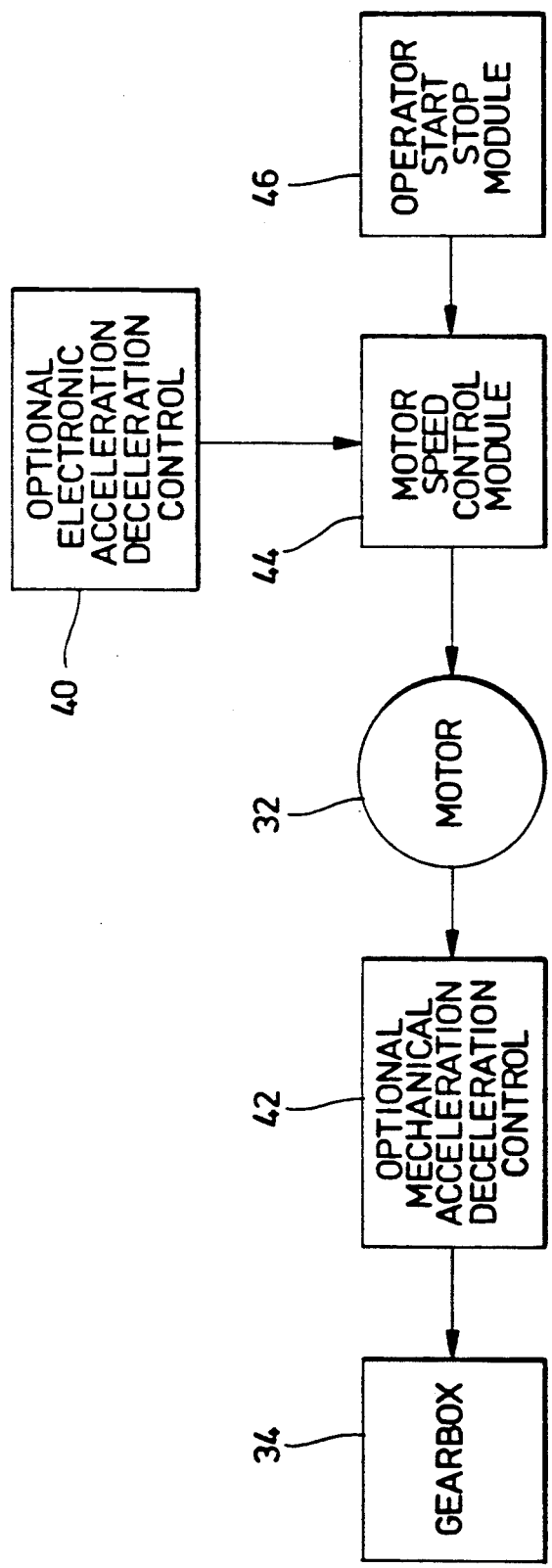
FIG. 4 is a block diagram of the conveyor system controls.

Referring to FIG. 4, a block diagram of the conveyor system and controls, including the optional electrical or mechanical means for controlling the acceleration and speed of the belt, illustrates a start-stop module 46, a motor speed control module 44, a motor or prime rotation source 32 and a gearbox 34. An optional electrical means 40 for controlling the speed, acceleration and deceleration of the belt may be connected at speed control module 44 and may comprise, for example, adjustable output power supply for DC motors, variable frequency supply for AC drives, and feedback systems, all of which and other techniques will be familiar to persons skilled in the art. Alternatively, an optional mechanical means 42 for controlling the speed, acceleration and deceleration of the belt may be connected between the motor 32 and gearbox 34 and may comprise, for example, fluid couplings, magnetic clutches, magnetic particles clutches and centrifugal clutches, all of which and other techniques will be familiar to persons skilled in the art.

Figure 2:
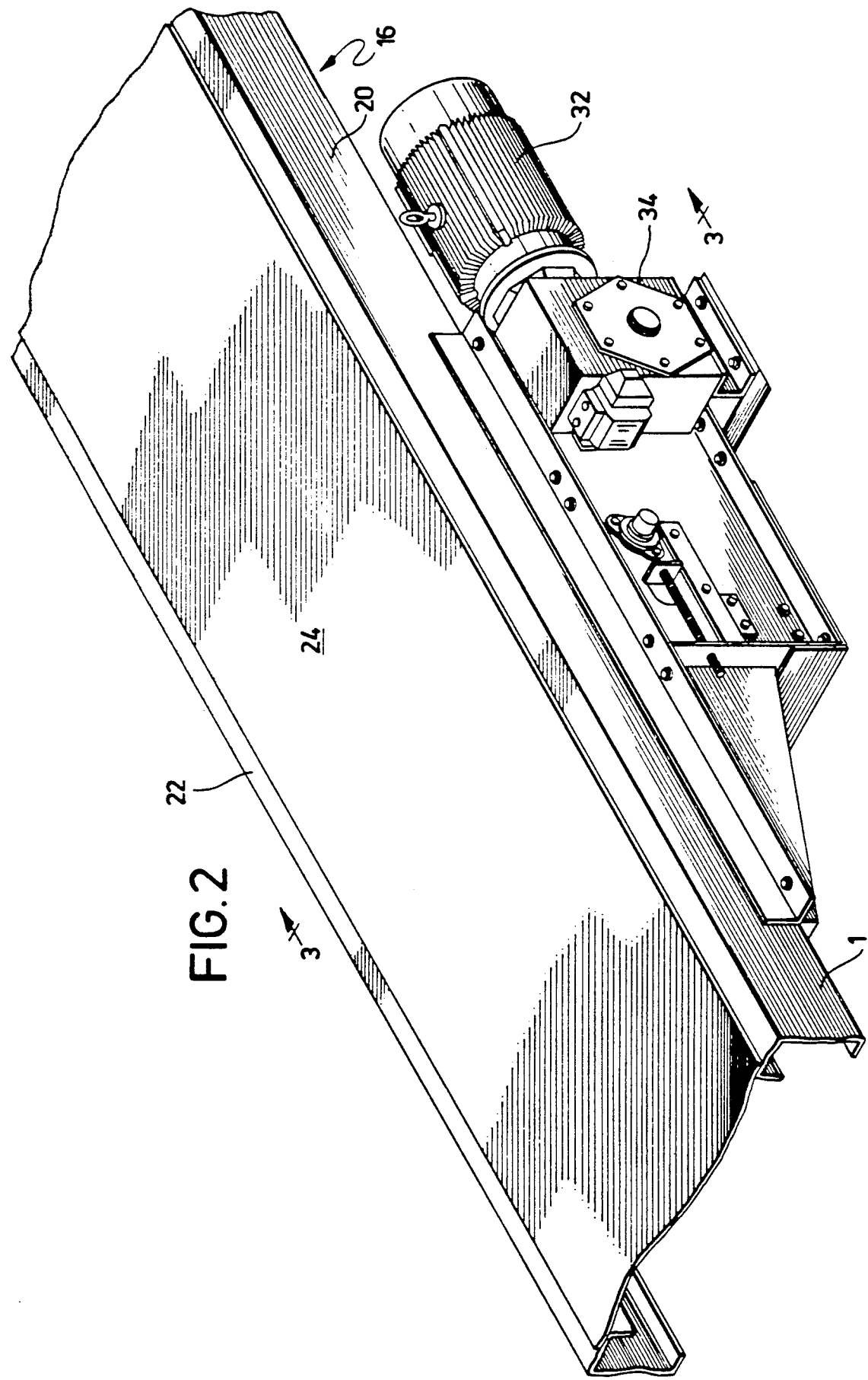
FIG. 2 is an isometric view of the system motor drive means.

An important feature of this invention is the means and the location of the means used to drive the belt 24. Referring to FIGS. 2 and 3, the belt driving means includes an electric motor, or other prime rotation source, 32 which is mounted either on, below, above or at the side of, frame member 20 by any appropriate and well-known means. The motor output shaft is coupled directly to a shaft-mounted gearbox 34 which is positioned adjacent the motor 32 beside the conveyor frame 20. The gearbox 34 has an output shaft 36 which is substantially larger in diameter than the shaft 38a of a drive pulley 38 which contacts the belt 24 in a manner well-known in the art. The gearbox output shaft 36 has an internal clearance opening sufficient to accommodate the drive pulley shaft 38a, and the pulley shaft 38a fits into the gearbox shaft 36 and is keyed thereto for means of rotation in a manner well known in the art.

This novel drive means design which uses a drive pulley attached directly to a shaft-mounted gearbox which is coupled directly to an electric motor eliminates the need for such additional drive components as chain drives, open gear trains, vee belts and gear belts which are normally found in systems of this type. Additionally, the drive means is attached to the side of the conveyor frame such that the driving components, the motor 32 and gearbox 34, are easily accessible for repair and/or maintenance without having to work beneath the conveyor frame as is the usual design in prior art systems of this type.

This new design and method for a package handling and conveying apparatus utilizing a combination roller bed/slider surface bed reduces the friction between the belt 24 and the roller/slider surfaces by approximately 75%. This substantial reduction in friction means that substantially less force will be placed on the belt, frame and drive components, thereby permitting lighter and more versatile frame members to be employed along with drive components having lower capacity ratings. The amount of power needed to operate a conveyor is directly proportional to the amount of pull which the belt requires, the speed of the belt and the acceleration time required. By removing approximately 75% of the friction force, the amount of power required for the system is greatly reduced.

The amount of power required and the forces experienced by the belt, drive components and frame structure can be further reduced by increasing the amount of time which the system takes for the belt to reach full speed. The present system uses either electronic means 40 or mechanical means 42 (FIG. 4) for accomplishing this acceleration time adjustment. The acceleration time adjustment means enables the motor 32 to be controlled in such a manner that the time for acceleration from stop to final speed is adjustable, whereby the substantial forces placed on the belt when the system is started under a full load of packages thereon is avoided and the life of the belt and drive components are substantially increased.

It will be appreciated that the present invention of a package handling and conveying system accomplishes the objects of improved reliability and maintainability by eliminating the substantial friction forces which contributed to the rapid deterioration of the belt and drive components and necessitated the use of larger, more expensive and less efficient components and drive mechanisms, by providing a novel system using a combination roller/slider conveyor bed which is driven by means of a drive pulley which is attached directly to a shaft-mounted gearbox which in turn is coupled directly to an electric motor which has acceleration time adjustment means to control the time for acceleration of the belt to a final speed.

Although the invention has been described and illustrated with respect to a preferred embodiment thereof, it is not to be so limited since changes and modifications may be made therein which are within the full intended scope of the invention.

What is claimed is:

1. Apparatus for handling and conveying packages comprising:

a conveyor frame including roller and slider surfaces used in combination to define a conveyor bed; said frame including a pair of opposed side frame members, each said side frame member including an upwardly facing slide surface;

a plurality of conveying rollers mounted between said side frame members, the upper most part of each said conveying roller being elevated with respect to said slide surfaces;

a plurality of return rollers mounted between said side frame members and below said conveying rollers;

an end pulley mounted between said side frame members at each end of said frame;

an endless belt positioned on said conveying rollers and extending over said slide surfaces to define a package supporting conveyor surface, said belt also mounted to contact said end pulleys and said return rollers;

a drive pulley mounted between said side frame members intermediate said end pulleys and below said return rollers and in contact with said belt, said drive pulley having an integral shaft with a driving key thereon, said integral shaft extending past one of said side frame members;

a shaft-mounted gearbox having a hollow output shaft with a keyway therein sized to receive said drive pulley shaft and driving key, said gearbox being mounted on and supported by said drive pulley shaft;

an electric motor coupled directly to said gearbox, said motor being supported by said drive pulley shaft; and means for controlling the speed and acceleration of said motor.

* * * * *